UNITED STATES PATENT OFFICE.

JOHN T. BUNTING, OF CHICAGO, ILLINOIS.

MEDICAL COMPOUND.

SPECIFICATION forming part of Letters Patent No. 325,586, dated September 1, 1885.

Application filed February 27, 1884. (No specimens.)

*To all whom it may concern:*

Be it known that I, JOHN T. BUNTING, of Chicago, in the county of Cook and State of Illinois, have invented a certain new and useful Medicinal Compound; and I do hereby declare that the following is a full, clear, and exact description thereof.

This invention relates to a medicinal compound for internal use in cases of cholera, cholera-morbus, cramps, pain in the bowels, diarrhea, dysentery, and similar ailments; and it consists in a preparation or compound the essential ingredients of which are the juice or sap of the white-oak tree, the juice or sap of the blackberry-vine, Jamaica ginger, and spirits of camphor, alcohol, or an equivalent spiritous liquor, and sugar.

In the preparation of the compound above mentioned, the juice or sap of the white-oak tree is obtained by tapping the tree in the spring and fall of the year in the same manner that is practiced in obtaining the sap of the maple and other trees. The fresh juice or sap obtained in this manner may be permitted to ferment, to allow the development therein of a certain amount of alcohol in the same manner that alcohol is produced in the fermentation of other vegetable juices—as, for instance, in the production of wine—after which the sap will remain unchanged and with its medicinal properties unaffected; but, preferably, the juice or sap when fresh is mixed with a sufficient quantity of alcohol or other spirituous liquor to preserve it unchanged, the proportionate quantity of alcohol in the mixture usually being about twenty-five per cent.

It has been found that the sap of the white-oak tree possesses very valuable astringent properties and tends to produce a cessation of the abnormal relaxation or flux generally present in diseases of the character mentioned, and to relieve the pain usually accompanying them. The said sap is at the same time entirely non-poisonous and free from hurtful effects upon the human system when taken in ordinary quantities.

The juice or sap of the blackberry-vine is obtained at the proper season of the year by making an incision in the vine in the same manner that the sap of a tree is obtained. The juice of a blackberry-vine also acts as an astringent, and exerts other beneficial effects upon the alimentary organs.

In connection with the ingredients before mentioned I use Jamaica ginger and spirits of camphor, which have a corrective effect upon the digestive and other alimentary organs, and a sufficient quantity of sugar to render the compound palatable. The several ingredients mentioned are preferably combined in the following proportions: sap of the white-oak tree, one-quarter ounce; sap of the blackberry-vine, one-half ounce; extract of Jamaica ginger, three ounces; spirits of camphor, two ounces; whisky, five and three-fourths ounces; sugar, ten ounces.

I am aware that extracts or decoctions of the white-oak bark have heretofore been used as remedies; but such preparations possess the medicinal qualities mentioned to a much less extent and operate much less favorably than the sap of the tree itself. I am also aware that ginger, camphor, and alcohol and sugar have heretofore been used together in a medicinal compound; but by adding to these ingredients the astringents above mentioned, a novel compound is obtained, possessing superior remedial qualities.

I claim as my invention—

A medicinal compound for the purposes mentioned, consisting of the juice or sap of the white-oak tree, the juice or sap of the blackberry-vine, extract of Jamaica ginger, spirits of camphor, alcohol or equivalent spirituous liquor, and sugar, substantially in the proportions specified.

In testimony that I claim the foregoing as my invention I affix my signature in presence of two witnesses.

JOHN T. BUNTING.

Witnesses:
C. CLARENCE POOLE,
OLIVER E. PAGIN.